United States Patent
Carboneri et al.

(10) Patent No.: US 7,141,096 B2
(45) Date of Patent: Nov. 28, 2006

(54) GAS-SELECTIVE PERMEABLE MEMBRANE AND METHOD OF MANUFACTURING THEREOF

(75) Inventors: Roberto Carboneri, Settimo Torinese (IT); Sandro Vittozzi, Turin (IT)

(73) Assignee: Varian S.p.A., Turin (IT)

( * ) Notice: Subject to any disclaimer, the term of this patent is extended or adjusted under 35 U.S.C. 154(b) by 439 days.

(21) Appl. No.: 10/760,573

(22) Filed: Jan. 20, 2004

(65) Prior Publication Data

US 2004/0149131 A1 Aug. 5, 2004

(30) Foreign Application Priority Data

Jan. 24, 2003 (IT) .................. TO2003A0032

(51) Int. Cl.
*B01D 53/22* (2006.01)

(52) U.S. Cl. ............... 96/4; 95/45; 95/53; 427/527; 73/40.5

(58) Field of Classification Search ............. 96/4, 96/7, 9, 11; 95/45, 53; 427/523, 527, 532, 427/535; 425/553; 73/40.5
See application file for complete search history.

(56) References Cited

U.S. PATENT DOCUMENTS

| | | | |
|---|---|---|---|
| 3,505,180 A | | 4/1970 | Brogden |
| 5,882,496 A | * | 3/1999 | Northrup et al. ............... 96/11 |
| 6,152,995 A | * | 11/2000 | Edlund ............................ 96/4 |
| 6,277,177 B1 | * | 8/2001 | Bley et al. ....................... 96/4 |
| 6,541,676 B1 | * | 4/2003 | Franz et al. ................... 96/11 |

FOREIGN PATENT DOCUMENTS

| | | | |
|---|---|---|---|
| DE | 101 22 733 A1 | * | 11/2002 |
| EP | 0352 371 B2 | | 3/1996 |
| JP | 8-73201 | * | 3/1996 |

* cited by examiner

*Primary Examiner*—Jason M. Greene
(74) *Attorney, Agent, or Firm*—Bella Fishman

(57) ABSTRACT

A gas-selective permeable membrane (1) utilisable in a leak detector for a gas, more particularly helium, comprising a sheet-like body (11) on which at least one reduced thickness area (15) is defined by removing a material from the sheet-like body. This at least one reduced thickness area (15) being permeable to at least one gas and formed so as that it is partly surrounded by a thicker and substantially gas-impermeable area (16) ensuring the structural strength of the membrane.

19 Claims, 3 Drawing Sheets

GAS-SELECTIVE PERMEABLE MEMBRANE AND METHOD OF MANUFACTURING THEREOF

This application claims Paris Convention priority of Italian application no. TO2003A000032 filed on Jan. 24, 2003.

BACKGROUND FO THE INVENTION

The present invention relates to a gas-selective permeable membrane, particularly for leak detectors, and to the method for its manufacturing.

In the field of leak detection in ducts, tanks etc., the use of apparatuses known as "leak detectors" is widespread. Such apparatuses generally comprise a vacuum-tight chamber equipped with a selective membrane through which only a predetermined gas can flow into the chamber, when the pressure inside the chamber is made significantly lower than the outside pressure.

The membranes of the known leak detectors are generally made of quartz or glass with high silica content. Such membranes are permeable to helium if they are brought to a suitable temperature, typically at least 300° C. Use of such membranes has become particularly popular also because helium is a harmless, inert gas that is present in very small amounts in the atmosphere and hence is suitable for use as a test gas for leak detection.

An electrical resistor is generally used to bring the membrane to the temperature at which the membrane material becomes permeable.

The operation of the leak detectors is as follows: once a sufficient vacuum has been created in the chamber, the detector can absorb, through the selective membrane, an amount of the test gas. If the test gas is present in the surrounding environment, for instance because of a leak from a volume into which said gas has been previously introduced, the gas penetrates into the detector chamber from which it is pumped to the outside by the vacuum pump. The presence of test gas within the chamber results in an increase of the electric current drawn by the vacuum pump if compared to vacuum conditions. The increase of the electric current is signalled by a detector informing of the presence of the test gas and, consequently, of a probable leak in the volume to be tested.

To achieve a good sensitivity, the membrane must be very thin, since gas permeability is inversely proportional to the membrane thickness. Moreover, the membrane must resist to high temperatures, since gas permeability is proportional to the membrane temperature.

The membranes presently used generally consist of a capillary tube and the electrical resistor for heating the membrane is helically wound around the capillary tube. A leak detector having a capillary tube membrane is disclosed for instance in patent application No. EP 0352371 "Helium leak detector with silica glass probe".

Capillary tube membranes however are fragile, and securing the capillary tube to the vacuum line is difficult. Moreover, the capillary tube shape is not satisfactory in terms of sensitivity, since it is impossible to heat the capillary tube surface wholly and uniformly to the ideal temperature for a good permeability to the test gas. This is due in part to the limitations in possibility of increasing the resistor's temperature, and the capillary tube is glued to the vacuum line.

Moreover, the capillary tube shape increases the chamber volume and, consequently, both the response inertia of the detector in the presence of the test gas, and the time necessary to have the detector again operating after a leak has been detected.

Planar membranes have been developed in the past to obviate these drawbacks.

These membranes have a composite structure in which a conventional metallic support layer, providing the structural strength, is associated with a thin layer of a material selectively permeable to the test gas. The support layer, which is of a gas impermeable material, has openings or windows through which the permeable layer is exposed at both faces. An example of such a membrane is disclosed in U.S. Pat. No. 3,505,180, in which a hydrogen-permeable layer of palladium is superimposed to a metal support layer provided with openings.

Yet, also that solution is not wholly satisfactory because of the different physical properties of the materials forming the membrane. For instance, the different thermal expansion coefficients may compromise the membrane life. Moreover, separation phenomena of the different layers forming the composite structure may occur. The latter drawback is very penalising in terms of permeability to the test gas, since it limits the temperature to which the membrane can be heated.

It is a main object of the present invention to provide a selective membrane for leak detectors, allowing overcoming the above drawbacks, as well as a method for producing such a membrane.

It is another object of the present invention to provide a selective membrane for gas detection, having high sensitivity and reliability.

The above and other objects are achieved by a membrane for gas detection according to the invention, as claimed in the appended claims.

SUMMARY OF THE INVENTION

The membrane of the present invention can be kept at high temperature, without risks of loss of integrity, and hence it provides an extremely sensitive and reliable means for leak detection.

A gas-selective membrane made of a body comprising a material that is permeable to at least one selected test gas and substantially impermeable to at least another gas. At least one reduced thickness area that is highly permeable to the selected test gas is formed on the body by removing the material from the body according to the detailed description of the method of manufacturing of the membrane. This reduced thickness area is surrounded by thicker area at least partly for structural strength of the membrane. The at least one reduced thickness area is heated by electrical resistor that partly covering the reduced thickness area.

An apparatus for gas leak detection having a vacuum-tight chamber with a vacuum pump connected thereto incorporates this gas-selective permeable membrane separating at least a portion of the vacuum chamber from the outside environment.

A non-limiting exemplary embodiment of the membrane according to the invention and of the method of manufacturing thereof is disclosed in the detailed description of the invention with reference to the accompanying drawings.

DETAILED DESCRIPTION OF THE PREFERRED EMBODIMENT

Figure 1:
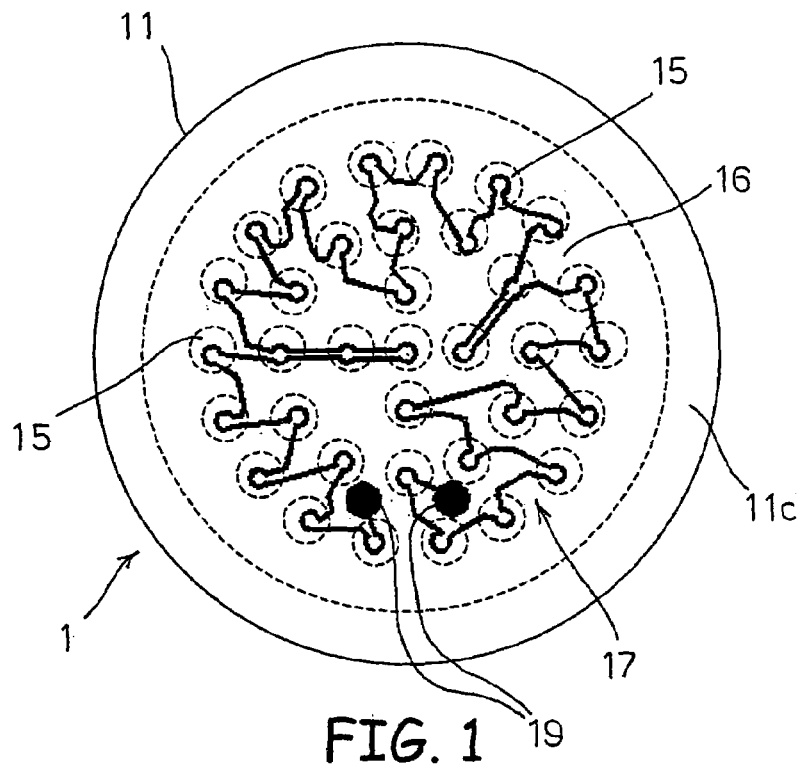
FIG. 1 is a plan view of the membrane for gas detection according to the invention.
Figure 2:
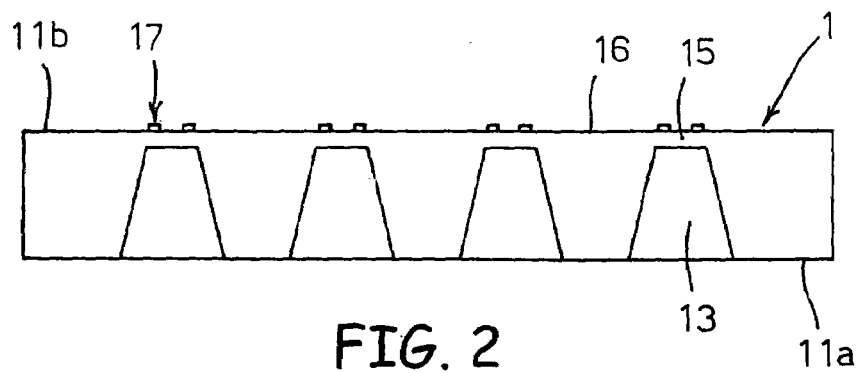
FIG. 2 is a schematic cross sectional view of the membrane according to the invention.

Referring to FIGS. 1 and 2, there is shown a membrane 1 according to the invention, comprising a body 11 in which dead cavities 13 are formed, which define an equal number of reduced thickness areas 15 on membrane 1.

Body 11 of membrane 1 preferably consists of a sheet-like disc and it is made of a material selectively permeable to gases.

For example, quartz, glass with high silica content and palladium are materials selectively permeable to gases.

If membrane 1 is used for detecting helium, the material used for producing the membrane will preferably be quartz or glass with high silica content. In such case, the thickness of membrane 1 will preferably be in the range 800 to 900 μm, and reduced thickness areas 15 will be about 10 μm thick.

Cavities 13 are preferably circular and have in axial direction an outward-flaring conical cross section. Moreover, said cavities 13 will preferably be formed on a same face 11a of membrane 1.

Heating means 17 are provided on the opposite face 11b of membrane 1. An electric resistor adhering to the face 11b of membrane 1 and extending through all reduced thickness areas 15 forms heating means 17.

Advantageously, in order to uniformly heat reduced thickness areas 15, resistor 17 extends along at least a portion of the perimeter of areas 15, preferably according to a circular path that is located substantially at an intermediate distance between the centre of each area 15 and the outer edge thereof.

Thus, areas 15 can be uniformly heated and the temperature required to make the material gas permeable is uniformly obtained over the whole corresponding area 15. Moreover, resistor 17 is equipped with a pair of terminals 19 for connecting resistor 17 to an electric current source (not shown).

Advantageously, according to the invention, both areas 15 and resistor 17 heating them is located within a perimeter defined by an annulus 11c having sufficient width to ensure the effective bonding of membrane 1, for instance by gluing, to the walls of the vacuum-tight chamber of the leak detector. Advantageously, said annulus 11c will be substantially "cold" with respect to areas 15, since it is not run through by resistor 17. Thus, the adhesion of membrane 1 to the chamber walls will not be harmed.

Figure 3:
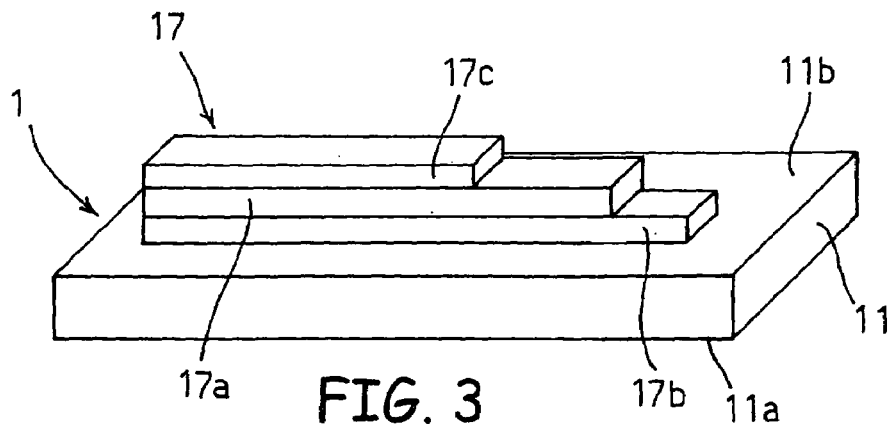
FIG. 3 is a perspective view of a detail of the membrane.

As better shown in FIG. 3, resistor 17 comprises a film 17a of a conductive material, preferably chromium or in the alternative copper or aluminium, and is bonded to membrane 1 through a layer of adhesive material 17b, for example of titanium. Conductive layer 17a is moreover coated with a protecting layer 17c, for instance of gold.

Figure 4:
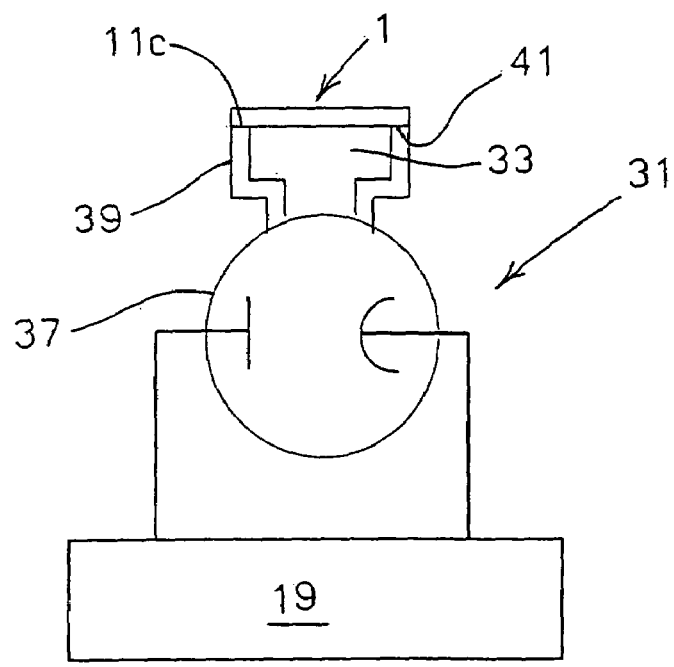
FIG. 4 is a schematic view of a leak detector equipped with a membrane according to the invention.

Referring to FIG. 4, there is schematically shown a leak detector, generally denoted 31. Detector 31 comprises a vacuum-tight chamber 33 obtained by means of a hollow cylindrical body 39, one end of which is connected to the suction port of a vacuum pump 37, for example, an ionic pump. The other end of chamber 33 is separated from the outside environment by a gas-selective permeable membrane 1, of the kind described with reference to the previous Figures.

Advantageously, said membrane 1 is bonded to cylindrical body 39 defining chamber 33 along circular rim 41 of said cylindrical body 39. Membrane 1 is preferably bonded to said rim 41 by gluing peripheral annulus 11c of membrane 1.

In the alternative, membrane 1 may be glued to a metal ring, subsequently brazed to rim 41 of chamber 33.

Membrane 1 is preferably mounted so that electric resistor 17 faces the outside of chamber 33.

Moreover, reduced thickness areas 15 are so distributed that annulus 11c of the membrane, attached by the gluing to rim 41, is kept at a sufficiently low temperature in order not to harm the holding of the gluing.

The apparatus thus obtained is placed in the environment to be tested, into which a certain amount of test gas might have been previously introduced. An electronic supply unit 19 connected to pump 17 is arranged to detect the presence of test gas, if any, inside chamber 33 thanks to the variation in the current drawn by the pump.

Referring to FIGS. 5a to 5d, the major steps of the method of manufacturing a gas-selective permeable membrane are shown.

Figure 5D:
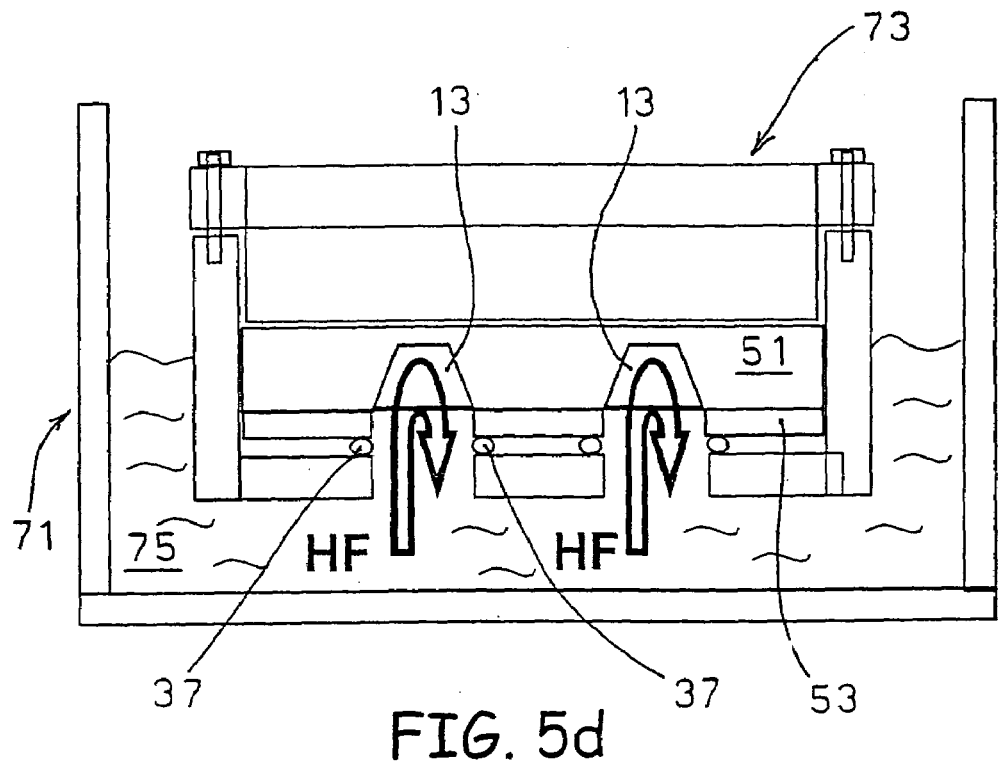
FIGS. 5a, 5b, 5c to 5d show the main steps of the method according to the invention for producing the membrane.
Figure 5A:
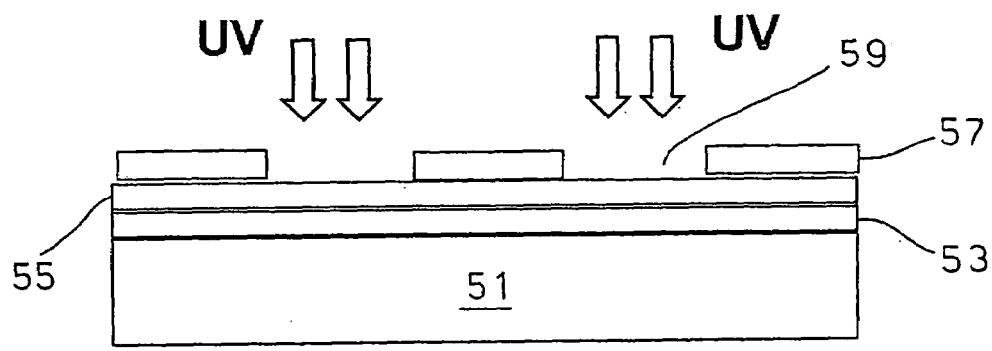

First, as shown in FIG. 5a, a sheet 51 of a material selectively permeable to the test gas, for instance amorphous quartz, is coated with a uniform layer of amorphous silicon 53. A thin uniform layer 55 of a photosensitive material, (for instance the commercially available material Photoresist HPR504 ARCH Positive) is applied onto layer 53. Subsequently layer 55 is covered with a lithographic mask 57 having openings 59 in correspondence with the areas of sheet 51 where a reduced thickness is to be obtained. Said mask 57 may be formed by instance by using chromium deposited on optical quartz, or a polyester film commercially available under the name "Mylar®".

The above assembly is exposed to ultra-violet radiation UV perpendicular to sheet 51, on the side where lithographic mask 57 is provided.

The effect of radiation is to remove material from photosensitive layer 55 in the exposed areas, i.e. in the areas corresponding to openings 59 in mask 57. Thus the pattern of openings 59 in mask 57 is reproduced on photosensitive layer 55.

Figure 5B:
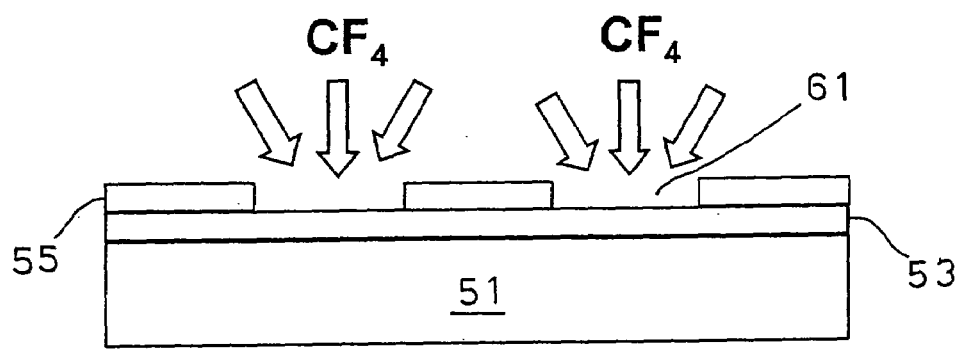

At the end of the irradiation step, lithographic mask 57 is removed and sheet 51 is submitted to dry etching by means of a plasma, preferably of $CF_4$, as shown in FIG. 5b. Plasma etching only affects amorphous silicon layer 53 in the exposed areas corresponding to openings 61 in photosensitive layer 55, so that the pattern of the openings in photosensitive layer 55 is reproduced on amorphous silicon layer 53.

Figure 5C:
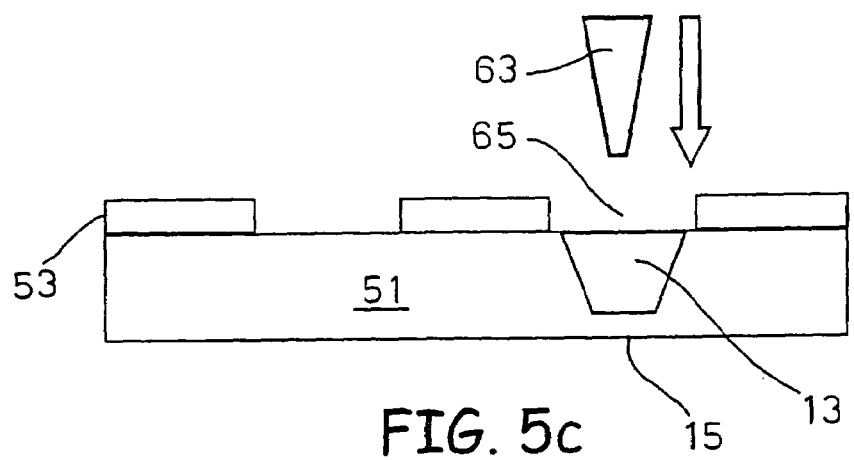

Photosensitive layer 55 is then removed and sheet 51 is submitted to drilling by a ultrasonic drill 63, as shown in FIG. 5c. Ultrasonic drilling only provided within the areas in sheet 51 that are left uncovered by amorphous silicon layer 53, in correspondence with openings 65, and creates a plurality of cavities 13 in sheet 51: thus, an equal number of reduced thickness areas 15, highly permeable to the test gas, will be defined.

A further step of the method according to the invention, shown in FIG. 5d, is a wet etching treatment. Sheet 51, still partly coated with amorphous silicon layer 53, is placed into a suitable cell 71, suspended by means of a frame 73 on which sheet 51 is placed while being supported by ring seals 37. Sheet 51 is immersed into a bath 75 of HF and water, by the action of which cavities 13 are finished by wet etching.

Once the processing of the membrane is complete, amorphous silicon layer 53 is removed and, if necessary, the heating resistor is applied.

According to another embodiment, the method of manufacturing the membrane is achieved by directly treating a sheet of a material selectively permeable to the test gas, for instance amorphous quartz, by ultrasounds in order to obtain a plurality of reduced thickness areas. According to this method, ultrasonic drills of extremely high precision should be utilised.

What is claimed is:

1. A gas-selective permeable membrane comprising:
   a body (11) of a material permeable to at least one selected test gas and substantially impermeable to at least another gas, said body (11) comprises at least one reduced thickness area (15) highly permeable to said test gas, said reduced thickness area (15) being at least partly surrounded by a thicker area (16) ensuring the structural strength of the membrane; and
   heating means (17) comprising an electrical resistor partly covering and selectively heating said at least one reduced thickness area (15), wherein remaining areas of said body are at lower temperature.

2. The gas-selective permeable membrane of claim 1, comprising a plurality of said reduced thickness areas (15), said reduced thickness areas (15) being completely surrounded by a plurality of thicker areas (16).

3. The gas-selective permeable membrane of claim 2, wherein said thicker areas (16) are substantially impermeable to said at least one selected test gas.

4. The gas-selective permeable membrane of claim 3, wherein said reduced thickness areas (15) have a circular shape.

5. The gas-selective permeable membrane of claim 4, wherein said body (11) is shaped as a planar disc.

6. The gas-selective permeable membrane of claim 5, wherein said reduced thickness areas (15) are distributed on a same face of said disc.

7. The gas-selective permeable membrane of claim 6, wherein said reduced thickness areas (15) are randomly distributed.

8. The gas-selective permeable membrane of claim 7, wherein said reduced thickness areas (15) are formed by corresponding dead cavities (13) with conical and outward-flaring longitudinal cross-section.

9. The gas-selective permeable membrane of claim 1, wherein said reduced thickness areas (15) have substantially circular shape, and wherein said electrical resistor extends along at least part of a circumference of which the diameter is between the diameter of said reduced thickness areas (15) and a centre thereof.

10. The gas-selective permeable membrane of claim 9, wherein said electrical resistor (17) comprises a film (17a) of a conductive material bonded to said body through an adhesive layer (17b), said conductive film being coated with a protecting layer (17c).

11. The gas-selective permeable membrane of claim 10, wherein said film (17a) is made of a material selected from the group consisting of chromium, copper and aluminium.

12. The gas-selective permeable membrane of claim 10, wherein said adhesive layer (17b) is made of titanium.

13. The gas-selective permeable membrane of claim 10, wherein said protecting layer (17c) is made of gold.

14. The gas-selective permeable membrane of claim 1, wherein said body is made of quartz or glass with high silica content, and wherein said at least one selected gas is helium.

15. The gas-selective permeable membrane of claim 14, wherein said body is a sheet having a thickness in a range of 800 to 900 µm, and wherein said reduced thickness areas (15) are about 10 µm thick.

16. An apparatus for gas leak detection, comprising:
    a vacuum-tight chamber;
    a vacuum pump connected to said chamber to bring the pressure in said chamber to a lower value than in an outside environment;
    a gas-selective permeable membrane separating at least a portion of said chamber from the outside environment, said membrane comprising:
       a body of a material permeable to at least one selected test gas and substantially impermeable to at least another gas, said body comprising at least one reduced thickness area highly permeable to said test gas, said reduced thickness area being at least partly surrounded by a thicker area;
       heating means for heating said at least one reduced thickness area with an electrical resistor partly covering, selectively heating said reduced thickness area, and providing temperature gradient between heated and unheated areas of said body; and
    means for detecting a presence of said at least one selected test gas in said chamber.

17. The apparatus for gas leak detection of claim 16, wherein said body of said gas-selective permeable membrane is a planar disk with a plurality of said reduced thickness areas having circular shapers being completely surrounded by a plurality of said thicker areas that are substantially impermeable to said at least one selected test gas.

18. A method of manufacturing a gas-selective permeable membrane, comprising the steps of:
    providing a body (11) of a material permeable to at least one determined test gas and substantially impermeable to at least another gas;
    coating a face of said body (11) with a layer of amorphous silicon (53);
    coating said layer of amorphous silicon with a layer (55) of a photosensitive material;
    covering said photosensitive layer (55) with a lithographic mask (57) having a plurality of openings (59);
    submitting said face to ultra-violet ray irradiation;
    removing said lithographic mask (57) and submitting said face to a dry etching process by a plasma treatment;
    removing said layer (55) of photosensitive material and submitting said face to an ultrasonic drilling process;
    submitting said face to a wet etching process in a bath of an acid solution, and removing said amorphous silicon layer (53);
    forming at least one reduced thickness area (15) permeable to said at least one gas on said body (11), and
    applying a film of conductive material forming an electrical resistor (17) onto a planar sheet (51) of said body 11 by gluing or deposition.

19. The method of claim 18, wherein said bath is an aqueous HF solution.

* * * * *